(12) United States Patent
Nakamura et al.

(10) Patent No.: US 11,397,643 B2
(45) Date of Patent: Jul. 26, 2022

(54) STORAGE MANAGEMENT SYSTEM AND MANAGEMENT METHOD

(71) Applicant: Hitachi, Ltd., Tokyo (JP)

(72) Inventors: Takaki Nakamura, Tokyo (JP); Masakuni Agetsuma, Tokyo (JP); Takahiro Yamamoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/470,224

(22) Filed: Sep. 9, 2021

(65) Prior Publication Data

US 2022/0188190 A1      Jun. 16, 2022

(30) Foreign Application Priority Data

Dec. 16, 2020   (JP) .............................. JP2020-208086

(51) Int. Cl.
*G06F 11/10*      (2006.01)
*G06F 3/06*       (2006.01)

(52) U.S. Cl.
CPC ........ *G06F 11/1076* (2013.01); *G06F 3/0619* (2013.01); *G06F 3/0659* (2013.01); *G06F 3/0673* (2013.01)

(58) Field of Classification Search
CPC .. G06F 11/1076; G06F 3/0619; G06F 3/0659; G06F 3/0673
See application file for complete search history.

(56) References Cited

U.S. PATENT DOCUMENTS

| | | | |
|---|---|---|---|
| 7,949,662 B2 * | 5/2011 | Farber ................... | G06F 16/164 707/747 |
| 2010/0042675 A1 * | 2/2010 | Fujii .................... | G06F 11/2046 709/203 |
| 2012/0011318 A1 * | 1/2012 | Hasegawa ............. | G06F 3/0641 711/114 |
| 2019/0243553 A1 * | 8/2019 | Yamamoto ............ | G06F 3/0604 |
| 2020/0073552 A1 | 3/2020 | Ganesh | |

* cited by examiner

*Primary Examiner* — Kyle Vallecillo
(74) *Attorney, Agent, or Firm* — Baker Botts L.L.P.

(57) ABSTRACT

According to one embodiment, provided is a storage management system having a processor and managing a plurality of storages, in which the storage has a plurality of types of components, and performs redundantization of a data to be stored by combining the plurality of components, the storage management system has component management information indicating redundancy set for the component itself, and the processor sets a method of data protection of the storage based on the component management information and a request for the data protection for the data stored in the storage.

10 Claims, 18 Drawing Sheets

FIG. 6

NODE MANAGEMENT TABLE — 501

| NODE NUMBER (601) | FAILURE TOLERANCE RESOURCE (602) | AVAILABILITY RATE (%) (603) | AFR (%) (604) | MTBF (HOUR) (605) | MTTR (HOUR) (606) |
|---|---|---|---|---|---|
| N1 | POWER SUPPLY FAN NETWORK | 99.9 | 0.1 | 1000 | 10 |
| N2 | POWER SUPPLY FAN NETWORK | 99.9 | 0.1 | 1000 | 10 |
| N3 | NETWORK | 99.9 | 0.1 | 1000 | 10 |
| N4 | NETWORK | 99.9 | 0.1 | 1000 | 10 |
| N5 | NETWORK | 99.9 | 0.1 | 1000 | 10 |
| ... | | | | | |
| | | | | | |
| | | | | | |
| | | | | | |

| BACK-END DEVICE MANAGEMENT TABLE | | | | | | | | | |
|---|---|---|---|---|---|---|---|---|---|
| 701 | 702 | 703 | 704 | 705 | 706 | 707 | 708 | 709 | 710 |
| DEVICE NUMBER | NODE NUMBER | REDUNDANCY | FAILURE TOLERANCE RESOURCE | SS-IMG BACKUP | AVAILABILITY RATE (%) | AFR (%) | MTBF (HOUR) | MTTR (HOUR) | COST ($/YEAR/GB) |
| D1 | N1 | 1 | N/A | ABSENT | N/A | 0.4 | 1000 | N/A | 0.5 |
| D2 | N1 | 3 | NODE DEVICE | PRESENT | 99.9 | 0.1 | 1000 | 10 | 0.9 |
| D3 | N1 | 2 | DEVICE | PRESENT | 99.9 | 0.1 | 1000 | 10 | 0.7 |
| D4 | N1 | 2 | DEVICE | PRESENT | 99.9 | 0.1 | 1000 | 10 | 0.7 |
| D5 | N2 | 1 | N/A | ABSENT | N/A | 0.4 | 1000 | N/A | 0.5 |
| D6 | N2 | 3 | NODE DEVICE | PRESENT | 99.9 | 0.1 | 1000 | 10 | 0.9 |
| D7 | N2 | 2 | DEVICE | PRESENT | 99.9 | 0.1 | 1000 | 10 | 0.7 |
| D8 | N2 | 2 | DEVICE | PRESENT | 99.9 | 0.1 | 1000 | 10 | 0.7 |
| ... | | | | | | | | | |

| OUTSIDE-CLUSTER DATA PROTECTION DESTINATION MANAGEMENT TABLE |||||||| 
|---|---|---|---|---|---|---|---|
| 801 | 802 | 803 | 804 | 805 | 806 | 807 | 808 |
| PROTECTION DESTINATION MANAGEMENT NUMBER | CONNECTION INFORMATION | AZ | SITE | SERVICE PROVIDER | AVAILABILITY RATE (%) | AFR (%) | COST ($/YEAR/GB) |
| P1 | 10.1.2.3 | SAME | SAME | SAME | 99.99 | 0.1 | 1 |
| P2 | 10.1.2.4 | SAME | SAME | SAME | 99.99 | 0.1 | 1 |
| P3 | 10.1.2.5 | SAME | SAME | SAME | 99.99 | 0.1 | 1 |
| P4 | 30.4.4.4 | SAME | SAME | SAME | 99.99 | 0.1 | 1 |
| P5 | 20.4.5.6 | DIFFERENT | SAME | SAME | 98.00 | 0.2 | 2 |
| P6 | 12.2.2.2 | DIFFERENT | DIFFERENT | SAME | 98.00 | 0.2 | 2 |
| P7 | 30.4.4.4 | DIFFERENT | DIFFERENT | DIFFERENT | 95.00 | 0.3 | 3 |
| ... | | | | | | | |
| | | | | | | | |
| | | | | | | | |
| | | | | | | | |

FIG. 9

| STORAGE CLASS MANAGEMENT TABLE | | |
|---|---|---|
| 901 | 902 | 903 |
| STORAGE CLASS MANAGEMENT NUMBER | REQUIREMENT | DATA PROTECTION DESTINATION CANDIDATE |
| C1 | DEVICE FAILURE: 2 REDUNDANCY<br>AZ FAILURE: 2 REDUNDANCY | D3+P5: D4+P5: |
| C2 | OPERATING RATE IN ENTIRE SYSTEM<br>: 99.99% | D2+D6 |
| C3 | NODE FAILURE: 3 REDUNDANCY<br>SITE FAILURE: 2 REDUNDANCY<br>COST: 5$/YEAR/GB OR LESS | ... |
| ... | | |
| | | |
| | | |
| | | |

504

STORAGE MANAGEMENT SYSTEM AND MANAGEMENT METHOD

BACKGROUND OF THE INVENTION

1. Field of the Invention

The present invention relates to a storage management system and a management method.

2. Description of Related Art

There is a hyper-converged infrastructure (HCI) that is configured with a plurality of physical computers, and in which each physical computer operates both a computing service and a storage service. In the HCI configuration, a container computing service may be a case of operating as a container on a container base operating on a physical computer or a case of operating as a virtual computer on a hypervisor operating on a physical computer. Herein, a container or a virtual computer that provides a computing service is called an application instance.

In the HCI configuration, the storage service may be in a case of operating as a host OS operating on a physical computer or a process on a hypervisor, a case of operating as a container on a container base operating on the physical computer, or a case of operating as a virtual computer on the hypervisor operating on the physical computer. Herein, the process, the container, or the virtual computer that performs the storage service is called a storage service instance. The storage service instance provides a volume to the application instance. As data protection in the storage service, for example, there is known a method described in US-A-2020/0073552.

In the invention described in US-A-2020/0073552, there is a possibility that the data protection may be excessive.

SUMMARY OF THE INVENTION

According to a first aspect of the present invention, there is provided a storage management system having a processor and managing a plurality of storages, in which the storage has a plurality of types of components, and performs redundantization of a data to be stored by combining the plurality of components, the storage management system has component management information indicating redundancy set for the component itself, and the processor sets a method of data protection of the storage based on the component management information and a request for the data protection for the data stored in the storage.

According to a second aspect of the present invention, there is provided a management method executed by a storage management system having a processor and managing a plurality of storages, in which the storage has a plurality of types of components, and a data to be stored is redundantized by combining the plurality of components, the storage management system has component management information indicating redundancy set for the component itself, and the processor sets a method of data protection of the storage based on the component management information and a request for the data protection for the data stored in the storage.

According to the present invention, data protection can be appropriately performed based on a designated request for data protection.

BRIEF DESCRIPTION OF THE DRAWINGS

FIG. 6 is a diagram illustrating an example of a node management table;

FIG. 8 is a diagram illustrating an example of an outside-cluster data protection destination management table;

FIG. 9 is a diagram illustrating an example of a storage class management table;

DESCRIPTION OF EMBODIMENTS

Embodiments will be described with reference to the drawings. It is noted that the embodiments described below do not limit the invention according to the claims, and all of elements and combinations of the elements described in the embodiments are not always indispensable for the means for solving the problems with respect to the invention.

In the description hereinafter, information may be described by an expression of an "AAA table", but the information may be expressed by any data structure. That is, in order to indicate that the information does not depend on the data structure, the "AAA table" can be referred to as "AAA information". In addition, in the description hereinafter, the "processor unit" includes one or more processors. At least one processor is typically a central processing unit (CPU). The processor may include hardware circuits that perform a portion or all of the processing.

In addition, in the description hereinafter, a process may be described with a "program" as a subject of operation, but since the program is executed by allowing a processor (for example, CPU) to appropriately perform a specified process while using a storage resource (for example, a memory) and/or a communication interface device (for example, a port), the subject of the process may be a processor. The process described with the program as the subject of operation may be a process performed by a device including the processor. In addition, the processor may also include hardware circuits that perform a portion or all of the processes performed by the processor. A computer program may be installed on the device from a program source. The program source may be, for example, a program distribution server or a computer-readable storage medium.

In the description hereinafter, in some cases, the "container" may be described as a management target, but instead of the container, a "virtual computer (VM)" which is a virtualization method emulating the hardware of a physical computer or a "bare metal" which is a physical computer itself may be the management target.

First Embodiment

Hereinafter, a first embodiment of a computer system will be described with reference to FIGS. 1 to 17.

Figure 1:
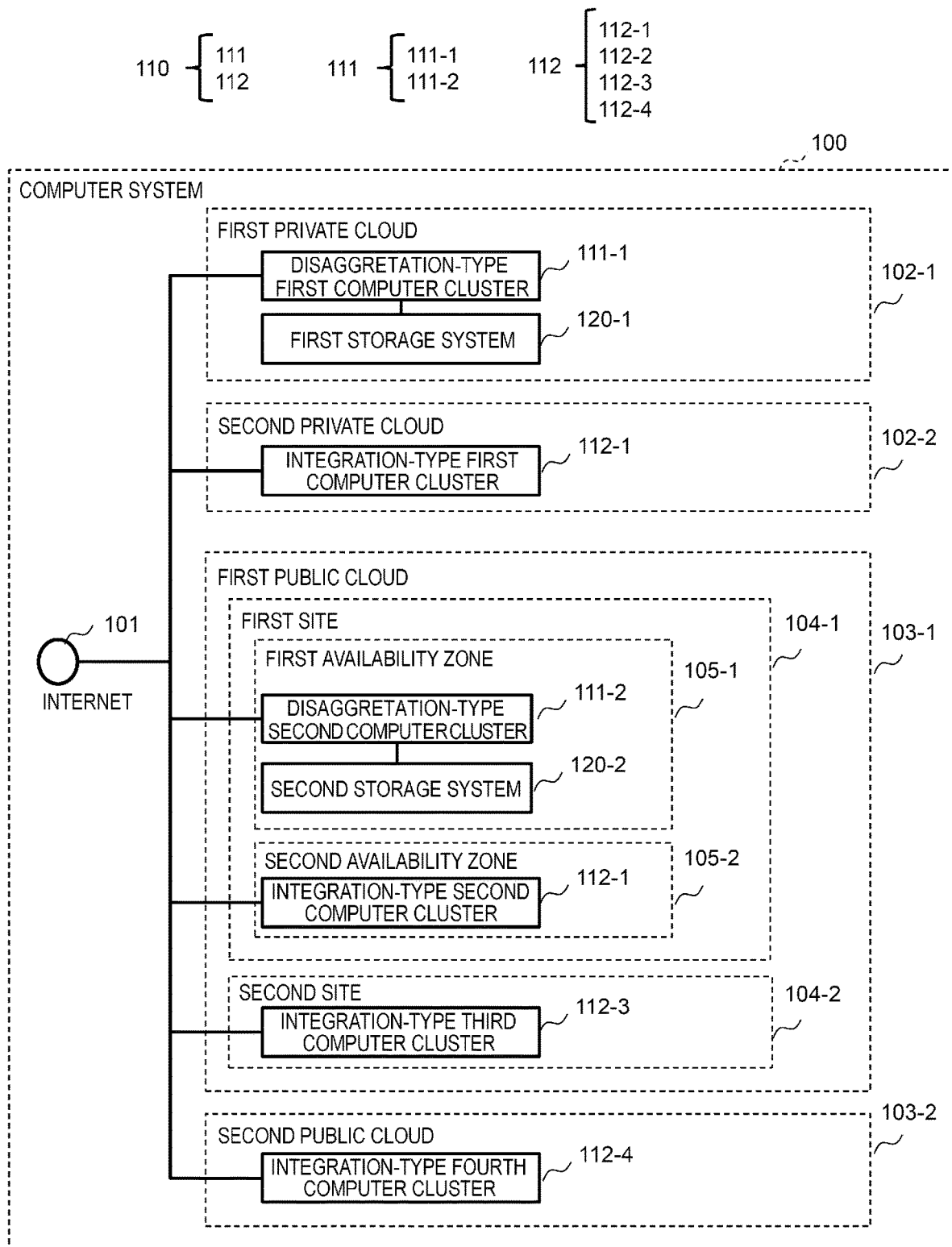
FIG. 1 is a configuration diagram of a computer system.

FIG. 1 is a configuration diagram of a computer system 100. The computer system 100 includes a first private cloud 102-1, a second private cloud 102-2, a first public cloud 103-1, and a second public cloud 103-2. The first public cloud 103-1 includes a first site 104-1 and a second site 104-2. The first site 104-1 includes a first availability zone 105-1 and a second availability zone 105-2. In FIG. 1, descriptions about some sites and availability zones (hereinafter, also referred to as "AZ") are omitted for the convenience of illustration.

The first private cloud 102-1 includes a disaggregation-type first computer cluster 111-1 and a first storage system 120-1. The second private cloud 102-2 includes an integration-type first computer cluster 112-1. The first availability zone 105-1 in the first public cloud 103-1 includes a disaggregation-type second computer cluster 111-2 and a second storage system 120-2. The second availability zone 105-2 in the first public cloud 103-1 includes an integration-type second computer cluster 112-2. The second site 104-2 in the first public cloud 103-1 includes an integration-type third computer cluster 112-3. The second public cloud 103-2 includes an integration-type fourth computer cluster 112-4.

Hereinafter, the disaggretation-type first computer cluster 111-1 and the disaggretation-type second computer cluster 111-2 are collectively referred to as a disaggretation-type computer cluster 111. The first storage system 120-1 and the second storage system 120-2 are collectively referred to as a storage system 120. The integration-type first computer cluster 112-1, the integration-type second computer cluster 112-2, the integration-type third computer cluster 112-3, and the integration-type fourth computer cluster 112-4 are collectively referred to as an integration-type computer cluster 112.

Figure 2:
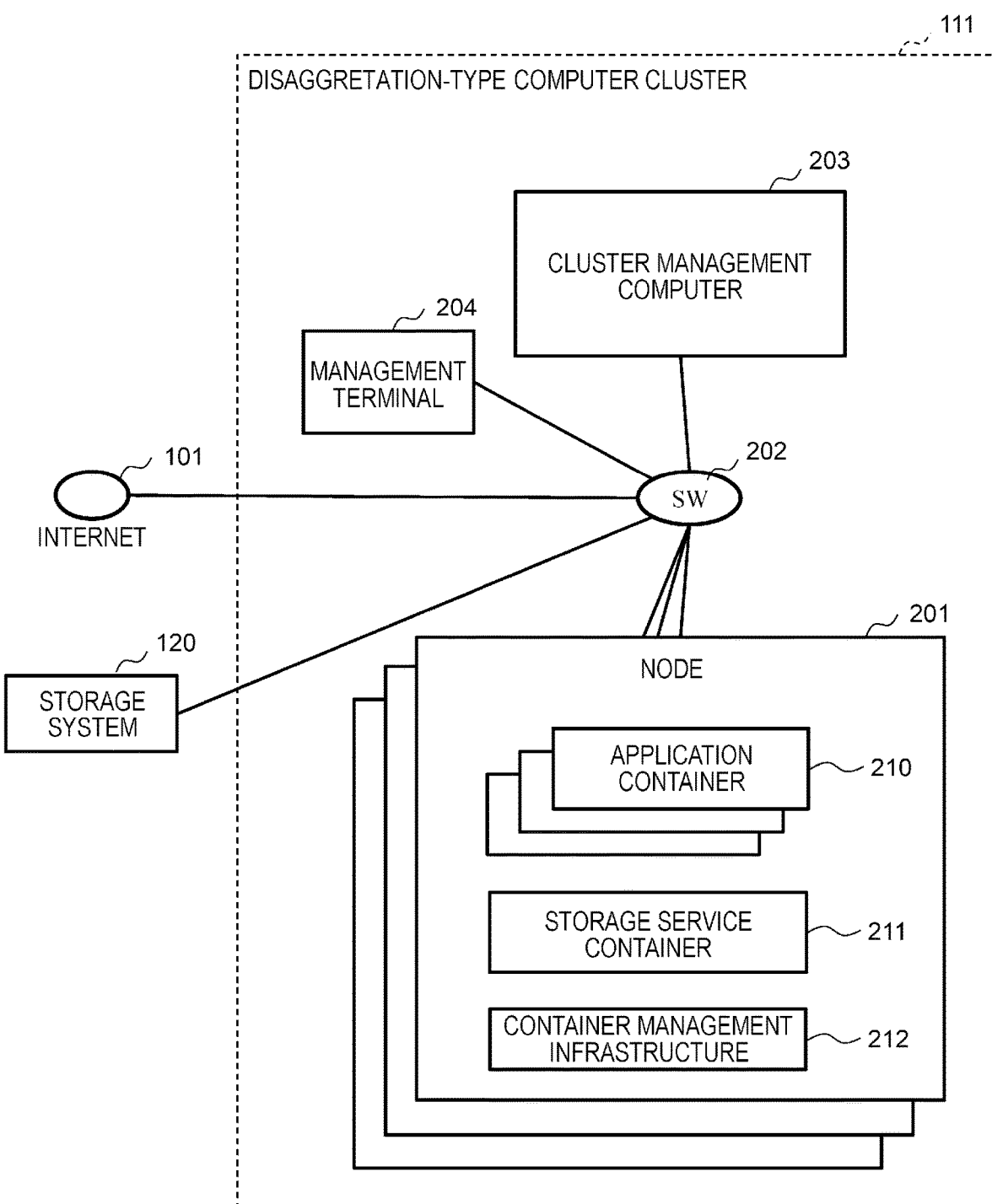
FIG. 2 is a configuration diagram of a disaggretation-type computer cluster.

FIG. 2 is a configuration diagram of the disaggretation-type computer cluster 111. The disaggretation-type computer cluster 111 includes one or more nodes 201, a network switch 202, a cluster management computer 203, and a management terminal 204. Each of the nodes 201 includes one or more application containers 210, a storage service container 211, and a container management infrastructure 212.

Although FIG. 2 illustrates an example in which the cluster management computer 203 and the node 201 are separately configured, the cluster management computer 203 and the node 201 may be configured by using one bare metal, that is, a physical computer. In addition, the node 201 and the cluster management computer 203 may be in a form of a virtual computer or may be in a form of a container configured by a container virtualization technology. In addition, the cluster management computer 203 may not necessarily be an independent device, and functions may be included in any of the nodes 201.

The storage service container 211 is an example of a storage service instance that provides a volume service to the application container 210. It is noted that, although the storage service container 211 of FIG. 2 is configured with a single container that operates on a container base that simulates an independent OS space, the storage service container 211 may be in a form of a virtual computer operating on a hypervisor emulating the hardware of a physical computer and the storage service container 211 may be in a form of a storage service operating on a hypervisor of a bare metal or a host OS. In addition, in some aspects, the storage service may be provided by a plurality of containers or a plurality of virtual computers.

The application container 210 is a container used by a user of the hyper-converged infrastructure and is an example of an application service instance. The application container 210 may be in a form of a virtual computer or may be in a form of an application operating on a hypervisor of a bare metal or a host OS. The container management infrastructure 212 manages the application container 210 and the storage service container 211. The container management infrastructure 212 may be in a form of a virtual computer management infrastructure or a bare metal management infrastructure depending on an operation form of the storage service and the application.

A data protection process in the computer system 100 starts by allowing the user to input the requirements of a storage class by using the management terminal 204. The requirements of the storage class are a request for the data protection for the data stored in the storage. The request for the data protection includes a combination of a type of a failure and a redundancy, an availability probability, and a cost. However, the each request for the data protection may include at least one of these three items. It is noted that, in the following, the combination of the type of the failure and the redundancy may be referred to as "viewpoint of each component", and the probability of availability may be referred to as "viewpoint of entire system".

When the requirements are input, the computer system 100 calculates candidates for data protection destination matching the requirements and stores the candidates together with the storage class management numbers. Next, when the user designates the storage class management number and the required size of the volume, the computer system 100 creates the volume. The created volume stores a data designated by the user and a data generated by the application container 210 designated by the user.

Figure 3:
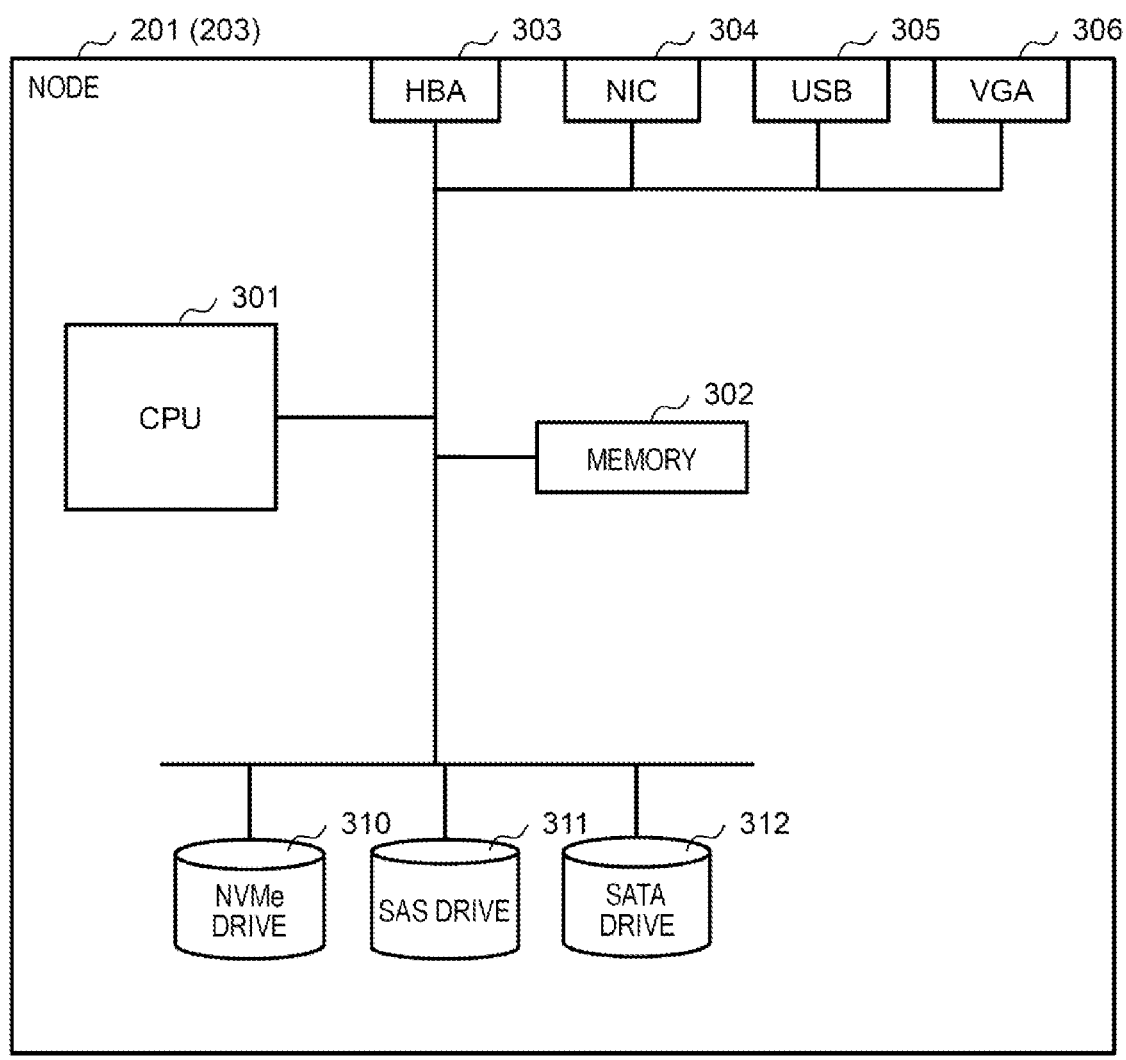
FIG. 3 is a hardware configuration diagram of a cluster management computer and a node.

FIG. 3 is a hardware configuration diagram of the cluster management computer 203 and the node 201. Hereinafter, the configuration of the node 201 will be described with reference to FIG. 3, but the hardware configuration of the cluster management computer 203 is also the same within the range described below.

The node 201 is configured with, for example, a computer such as a PC or a server, and as an example of a processor unit, includes a central processing unit (CPU) 301, a memory 302, a host bus adapter (HBA) 303, a network interface card (NIC) 304, a universal serial bus (USB) 305, a video graphics array (VGA) 306, and storage devices. These components are connected via an internal bus or an external bus. Examples of the storage device include a non-volatile memory express (NVMe) drive 310, a serial attached SCSI (SAS) drive 311 and a serial ATA (SATA) drive 312.

The node 201 is connected to the storage system 120 via the NIC 304 or the HBA 303. In addition, the storage device such as the NVMe drive 310 may be connected to the CPU 301 or the like via a RAID card (not illustrated).

Figure 4:
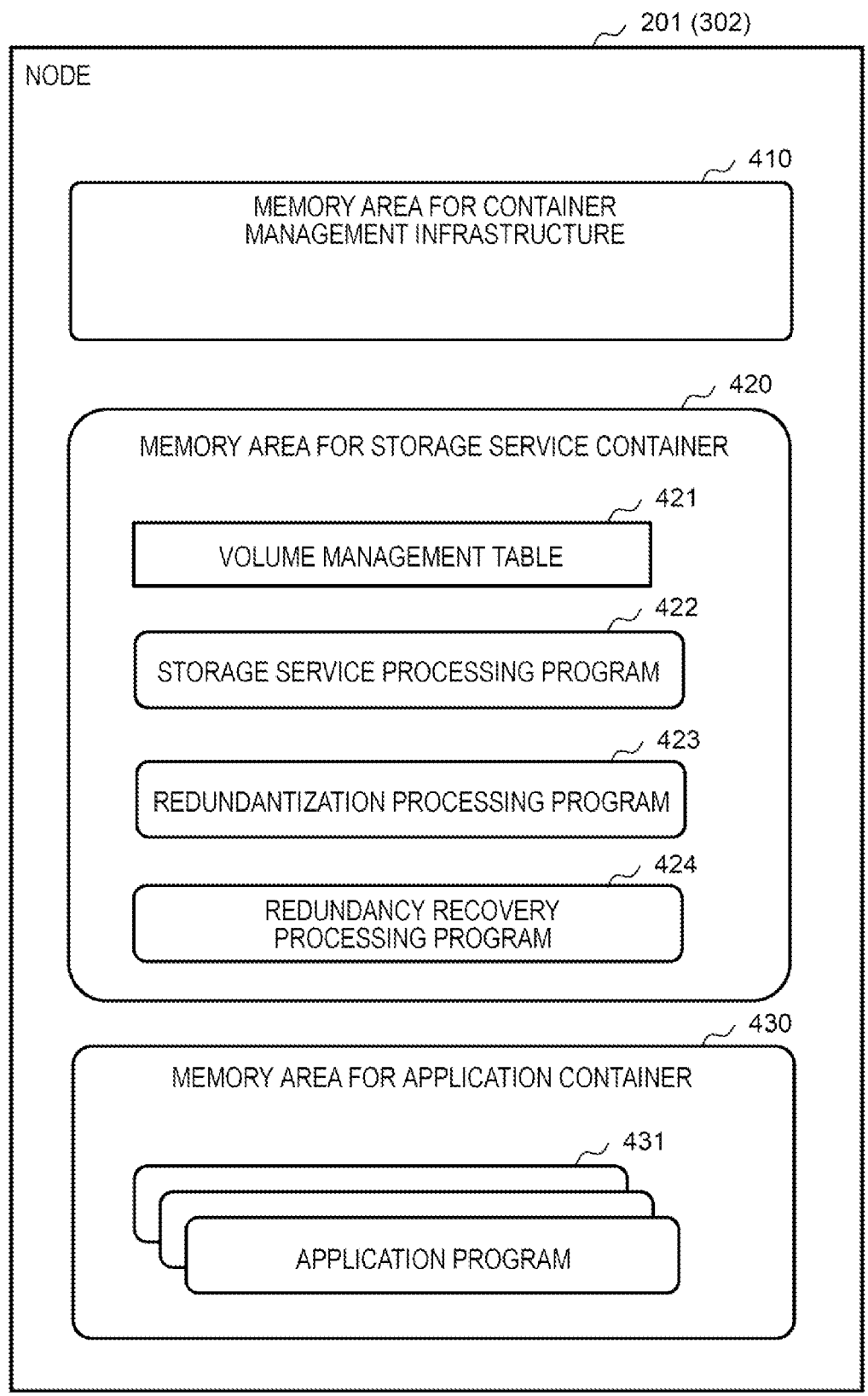
FIG. 4 is a diagram illustrating information stored in a memory of a node.

FIG. 4 is a diagram illustrating information stored in the memory 302 of the node 201. The memory 302 of the node 201 includes a memory area 410 for the container management infrastructure, a memory area 420 for the storage service container, and a memory area 430 for the application container. The memory area 420 for the storage service container stores a volume management table 421, a storage service process program 422, a redundantization process program 423, and a redundancy recovery process program 424. The memory area 430 for the application container stores one or more application programs 431.

The volume management table 421 stores information on the data protection destination for each volume. The storage service process program 422 is a program that performs known processing for implementing the service of the hyper-converged infrastructure. The storage service process program 422 outputs an operation command to the redundantization process program 423 as needed. The redundantization process program 423 is a program that executes the redundantization process. The operation of the redundantization process program 423 will be described in detail later with reference to FIG. 17. The redundancy recovery process program 424 is called from the data redundancy maintenance/recovery program 512 and writes a data to the data protection destination designated for recovering the redundancy.

Figure 5:
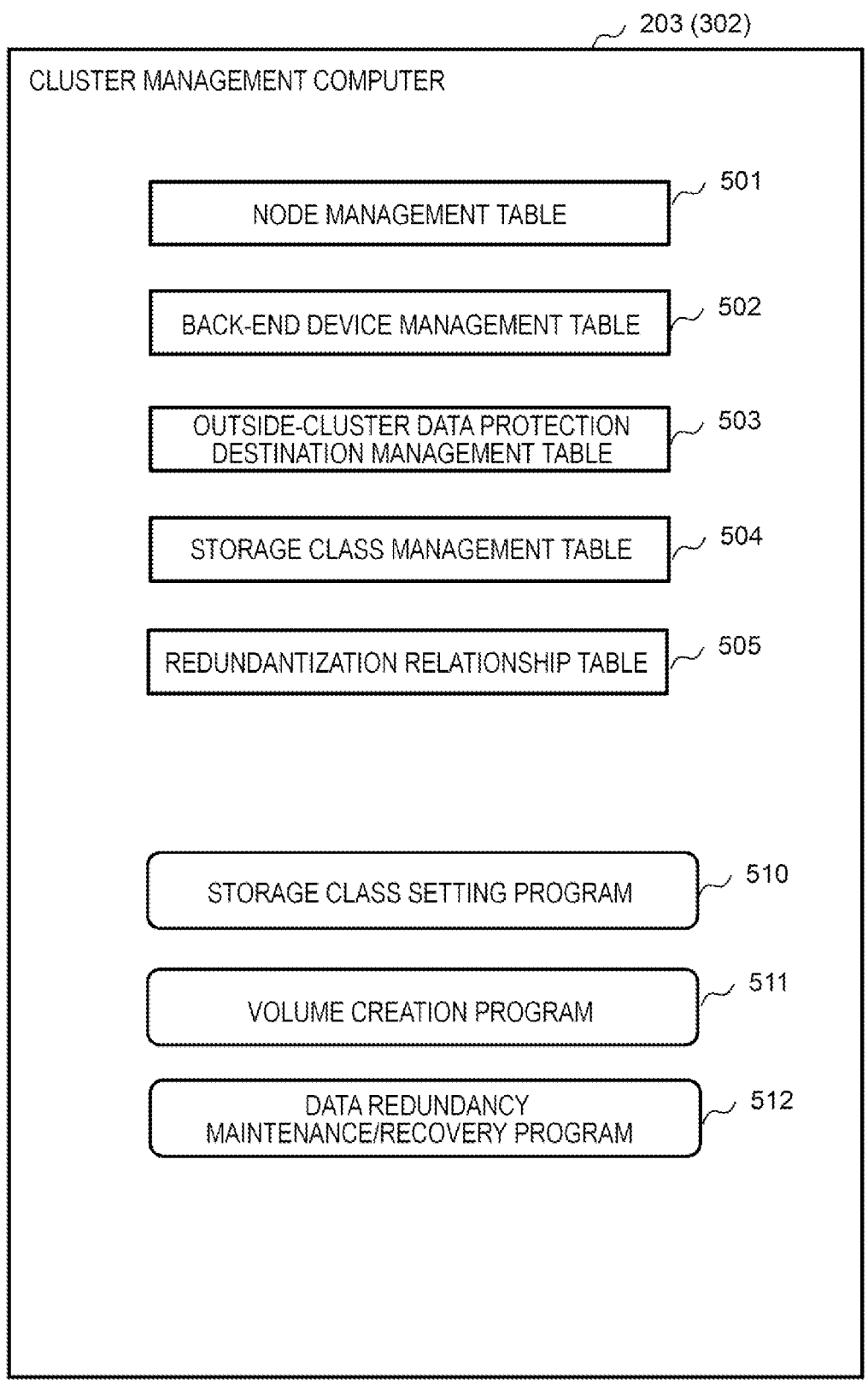
FIG. 5 is a diagram illustrating information stored in a memory of a cluster management computer.

FIG. 5 is a diagram illustrating information stored in the memory 302 of the cluster management computer 203. The memory 302 of the node 201 stores a node management table 501, a back-end device management table 502, an outside-cluster data protection destination management table 503, a storage class management table 504, a redundantization relationship table 505, and a storage class setting program 510, a volume creation program 511, and a data redundancy maintenance/recovery program 512.

The node management table 501 lists information about each node in a particular cluster. However, instead of storing the node management table 501 in the cluster management computer 203, information corresponding to the node management table 501 of each node may be stored inside each corresponding node. The back-end device management table 502 stores information about all the devices included in the particular cluster. However, instead of storing the back-end device management table 502 in the cluster management computer 203, information corresponding to the back-end device management table 502 of each node may be stored inside each corresponding node. In addition, hereinafter, the back-end device management table 502 will also be referred to as "component management information".

The outside-cluster data protection destination management table 503 stores information on the data storage area in another cluster. The storage class management table 504 stores a list of candidates of the data protection destination for the requirements of the data protection requested by the user. The redundantization relationship table 505 lists components that can ensure the same redundancy other than the designated components in order to guarantee the redundancy.

The storage class setting program 510 receives the requirements of the storage class from the management terminal 204, starts the operation, and describes the candidates satisfying the designated requirements in the storage class management table 504. The operation of the storage class setting program 510 will be described in detail later with reference to FIG. 12. The volume creation program 511 creates the volume satisfying the requirements for the volume designated by the management terminal 204. The operation of the volume creation program 511 will be described in detail later with reference to FIG. 15. The data redundancy maintenance/recovery program 512 detects the failure and performs maintenance/recovery of the data redundancy. The operation of the data redundancy maintenance/recovery program 512 will be described in detail later with reference to FIG. 16.

FIG. 6 is a diagram illustrating an example of the node management table 501. The node management table 501 is configured with a plurality of records, and each record has fields of a node number 601, a failure tolerance resource 602, an availability rate 603, an AFR 604, an MTBF 605, and an MTTR 606. The node number 601 stores an identifier of each node. In the embodiment, the node identifier is a combination of "N" and a number. The failure tolerance resource 602 stores the type of tolerance of the node. For example, a node provided with a duplicate power supply is described as a "power supply" in the field of failure tolerance resource 602. The node having a node number of "N1" is represented so as to be tolerant of power supplies, fans, and networks.

The availability rate 603 stores the availability rate of the node. The AFR 604 stores the annual average failure rate of the node. The MTBF 605 stores the mean time between failures of the nodes. The MTTR 606 stores the mean time to repair of the node.

Figure 7:
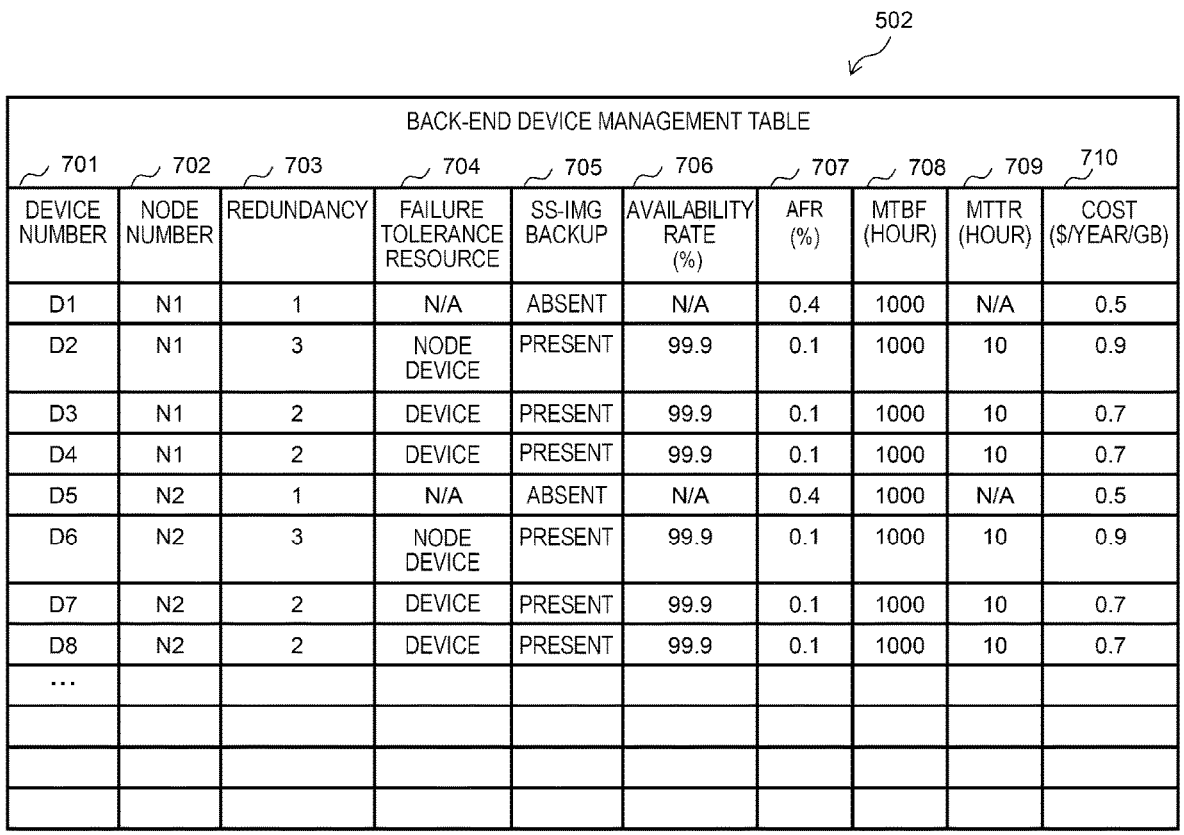
FIG. 7 is a diagram illustrating an example of a back-end device management table.

FIG. 7 is a diagram illustrating an example of the back-end device management table 502. The back-end device management table 502 is configured with a plurality of records, and each record has fields of device number 701, a node number 702, a redundancy 703, a failure tolerance resource 704, a snapshot image (SS-IMG) backup 705, an availability rate 706, an AFR 707, an MTBF 708, an MTTR 709, and a cost 710.

The device number 701 stores an identifier of each device. The node number 702 stores the identifier of the node to which the device belongs. This identifier has the same meaning as the node number 601 in FIG. 6. The redundancy 703 stores a value indicating a degree of redundancy of the device. For example, a device having the redundancy 703 of "1" means that there is no redundancy. In other words, a device having the redundancy 703 of "2" or more is subjected to back-end protection, which is data protection at a back-end not managed by the cluster management computer 203 or the storage service container 211.

The failure tolerance resource 704 stores a type of tolerance of the device. For example, when a device having a built-in RAID card or the like performs mirroring in the device, the device is described as a "device" in the failure tolerance resource 704. In addition, in a case where a volume of an external storage system or the like is used, when the device is redundant among the nodes of the cluster, the device is described as a "node" in the failure tolerance resource 704.

The SS-IMG backup 705 stores information indicating whether or not a snapshot image (SS-IMG) of information stored in the device has been backed up. Since the availability rate 706, the AFR 707, the MTBF 708, and the MTTR 709 are the same information as the availability rate 603, the AFR 604, the MTBF 605, and the MTTR 606 in FIG. 6, the description thereof will be omitted. The cost 710 stores the cost of storing a data in the device, more specifically, the cost of storing a data of 1 GB for one year in dollars. For example, it is illustrated that, when the data of 1 GB is stored by using a device D1 for one year, a cost of $0.5 incurs.

FIG. 8 is a diagram illustrating an example of the outside-cluster data protection destination management table 503. The outside-cluster data protection destination management table 503 is configured with a plurality of records, and each record has fields of a protection destination management number 801, a connection information 802, an AZ 803, a site 804, a service provider 805, an availability rate 806, an AFR 807, and a cost 808. Since the availability rate 806, the AFR 807, and the cost 808 are the same information as the availability rate 706, the AFR 707, and the cost 710 in FIG. 7, the description thereof will be omitted.

The protection destination management number 801 stores an identifier of data protection destination existing outside a cluster. In the embodiment, a combination of "P" and a number is used as the identifier of the data protection destination. The connection information 802 stores the location of the data protection destination, for example, the IP address. The AZ 803 stores information indicating whether or not the cluster having the outside-cluster data protection destination management table 503 is the same as the availability zone of the data protection destination. The site 804 stores information indicating whether or not the cluster having the outside-cluster data protection destination management table 503 and the site of the data protection destination are the same. The service provider 805 stores information indicating whether or not the cluster having the outside-cluster data protection destination management table 503 and the service provider of the data protection destination are the same.

It is noted that the outside-cluster data protection destination management table 503 may include other indicators related to reliability and availability such as MTBF and MTTR. The AZ 803, the site 804, and the service provider 805 may stores some identifiers instead of the information as to whether or not to be the same. In this case, by separately managing the AZ of the storage cluster of the management source, the site, and the ID of the service provider, it is determined whether to be the same or different depending on whether the IDs match or do not match.

FIG. 9 is a diagram illustrating an example of the storage class management table 504. The storage class management table 504 is configured with a plurality of records, and each record has fields of a storage class management number 901, requirements 902, and a data protection destination candidate 903. The storage class management number 901 stores an identifier of the storage class. In the embodiment, the storage class uses an identifier that is a combination of "C" and a number. The requirement 902 stores the requirement of the storage class designated by the user, in other words, the request for the data protection for the data stored in the storage. The data protection destination candidate 903 stores the candidates of the data protection destination satisfying the request designated by the user. The candidates may be single or combined.

For example, in the first record illustrated in FIG. 9, the storage class of a management number "C1" is required by the user to have 2 redundancy to withstand the failure of the device and the failure of the AZ, and it is illustrated that the storage class is implemented with each of the combination of D3 and P5 and the combination of D4 and P5. When the storage class is added, all the combinations satisfying the requirements may be stored in the data protection destination candidate 903, or a portion of the combinations satisfying the requirements may be stored in the data protection destination candidate 903. In the latter case, when the free capacity decreases below a predetermined threshold value, a new data protection destination is added to the data protection destination candidate 903.

Figure 10:
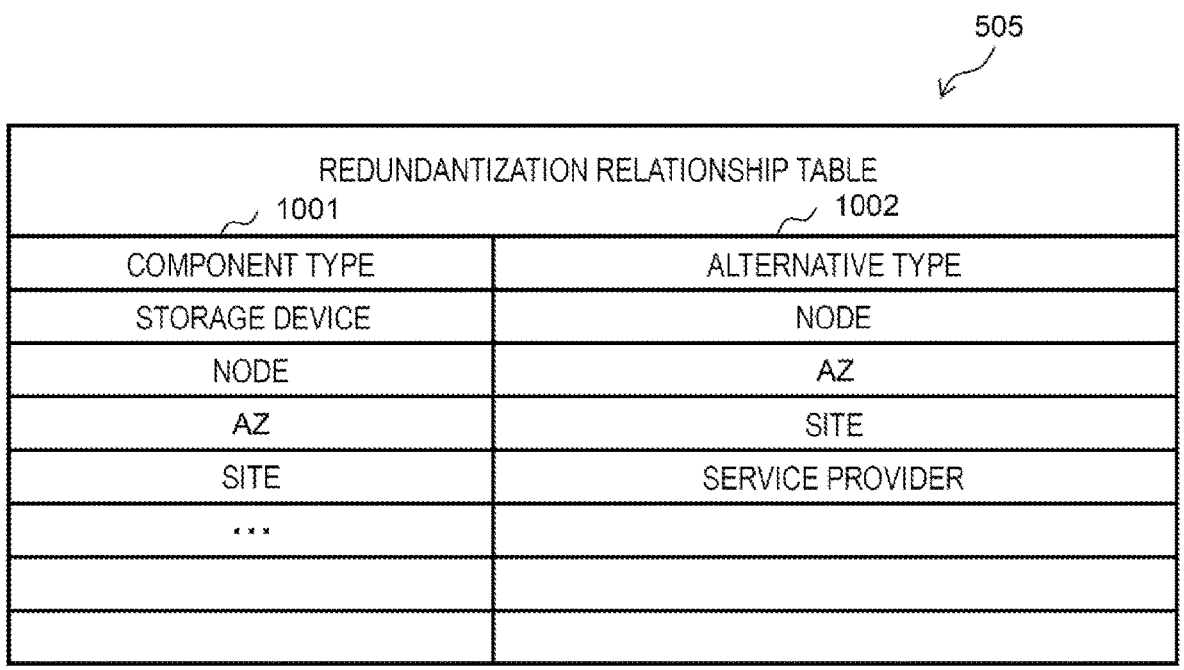
FIG. 10 is a diagram illustrating an example of a redundantization relationship table.

FIG. 10 is a diagram illustrating an example of the redundantization relationship table 505. The redundantization relationship table 505 is configured with a plurality of records, and each record has fields of a component type 1001 and an alternative type 1002. The component type 1001 stores a type of the component that is a redundantization target. The alternative type 1002 stores a type of component that can be redundantized alternatively. The first record illustrated in FIG. 10 illustrates that the redundantization of the storage device can be replaced by the redundantization of the node. It is noted that, by summarizing the information illustrated in FIG. 10, it is illustrated that the redundantization of the lower component in the network configuration can be replaced by the upper component.

Figure 11:
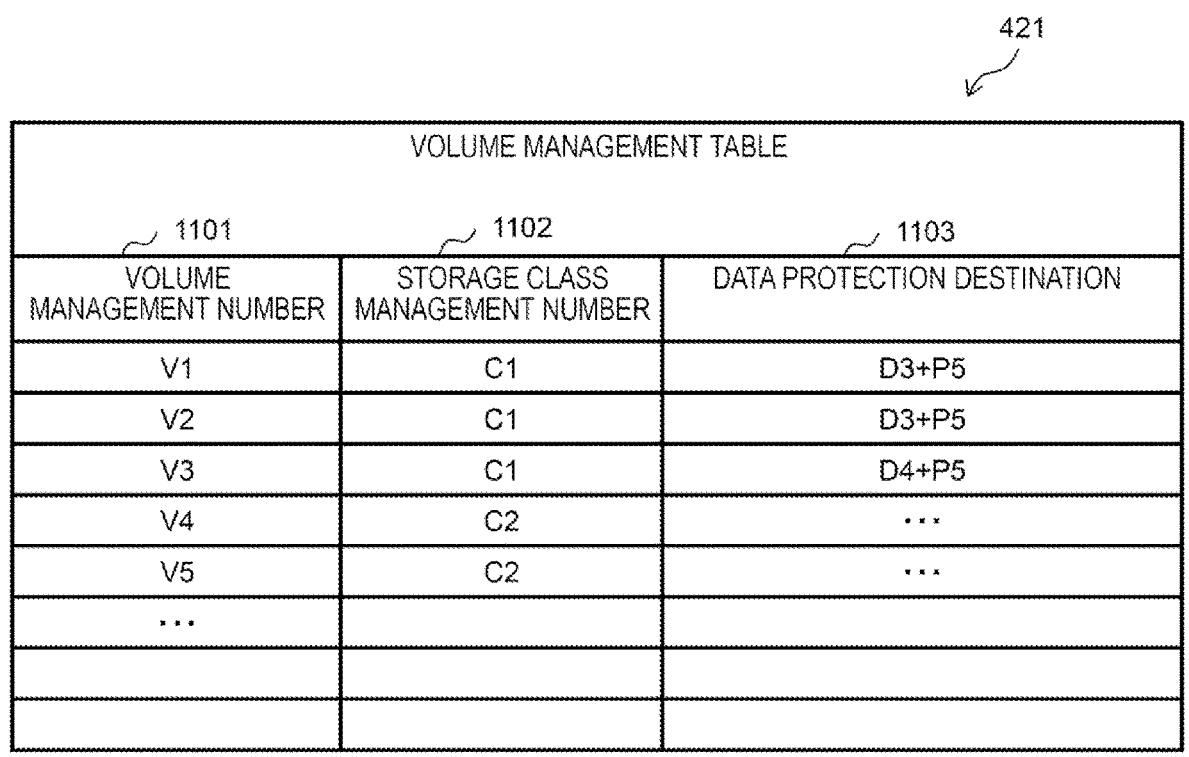
FIG. 11 is a diagram illustrating an example of a volume management table.

FIG. 11 is a diagram illustrating an example of the volume management table 421. The volume management table 421 is configured with a plurality of records, and each record has fields of a volume management number 1101, a storage class management number 1102, and a data protection destination 1103. The volume management number 1101 stores an identifier of the volume. In the embodiment, a combination of "V" and a number is used as the identifier of the volume. Since the storage class management number 1102 has the same meaning as the storage class management number 901 in FIG. 9, the description thereof will be omitted.

The data protection destination 1103 stores an identifier of the device or the like that stores the information of the volume. In the example illustrated in FIG. 11, it is illustrated that all of volume management numbers V1 to V3 correspond to the storage class C1, V1 and V2 use the combination of D3 and P5, and V3 uses the combination of D4 and P5. It is noted that, when the protection destination is different for each portion of the volume, a plurality of pieces of information are stored in the data protection destination.

(Flowchart)

Figure 12:
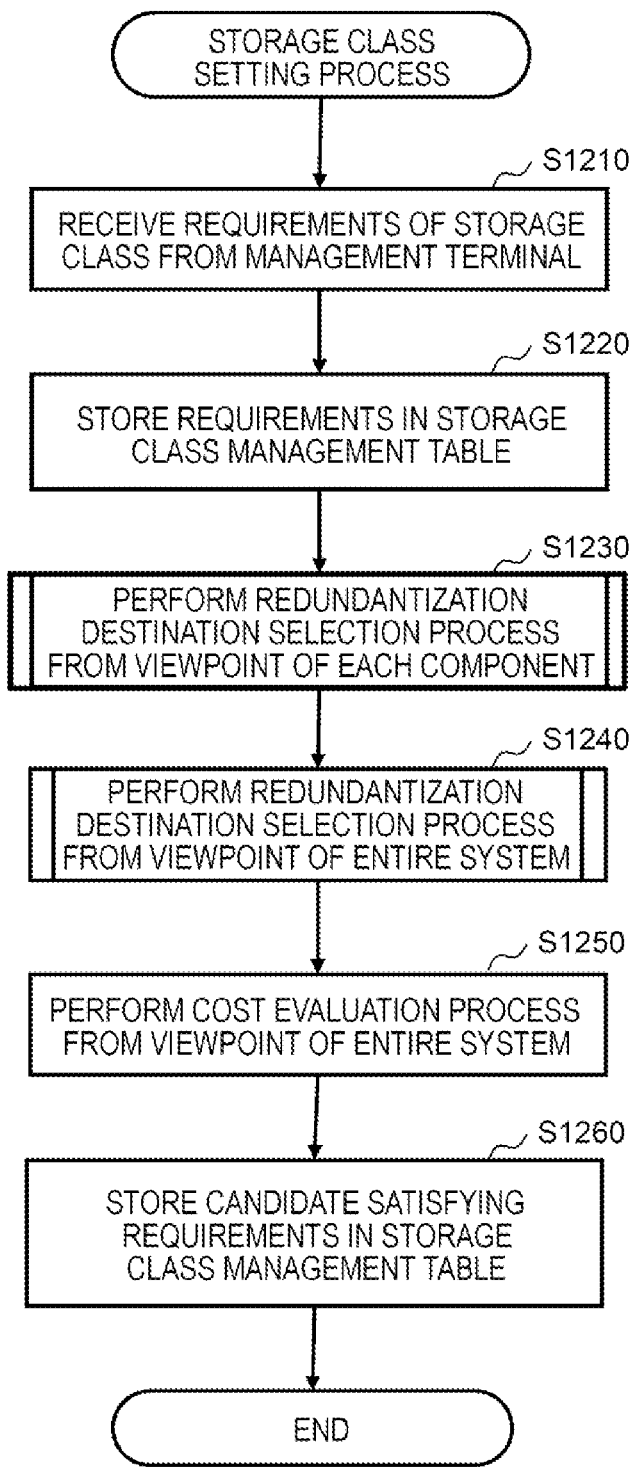
FIG. 12 is a flowchart illustrating a storage class setting process executed by a storage class setting program.

FIG. 12 is a flowchart illustrating a storage class setting process executed by the storage class setting program 510. First, in step S1210, the CPU 301 receives requirements of the storage class from the management terminal 204. In the subsequent step S1220, the CPU 301 determines a new management number by referring to the storage class management table 504, the management number is allowed to be written in the field of the storage class management number 901 of the storage class management table 504, and the requirements received in step S1210 is allowed to be written in the field of the requirement 902.

In the subsequent step S1230, the CPU 301 performs a redundantization destination selection process from the viewpoint of each component, that is, the determination of the candidates of the data protection destination satisfying the requirements of the combination of the type of the failure and the redundancy, as described later. However, when the request received in step S1210 does not include the condition from the viewpoint of the component, the CPU 301 does not execute step S1230.

In the subsequent step S1240, the CPU 301 performs the redundantization destination selection process from the viewpoint of the entire system, that is, the determination of the candidates of the data protection destination satisfying the requirements of the probability of availability. Specifically, when the request received in step S1210 includes the availability rate of the system, the CPU 301 executes this step and determines the candidates of the data protection destination so that the availability rate of the system is equal to or higher than the requested value. It is noted that, when there exists a node or a device for which the availability rate is not set in any one of the node management table 501 and the back-end device management table 502, the CPU 301 calculates the availability rate by a process described later.

In step S1250, the CPU 301 performs the cost evaluation process from the viewpoint of the system. Specifically, when the request received in step S1210 includes a condition of the cost, the CPU 301 is executed to calculate the cost by adding the costs of the devices included in the respective candidates for each of the candidates selected in steps S1230 and S1240.

In the subsequent step S1260, the CPU 301 stores the candidates satisfying all the requirements received in the step S1210 in the data protection destination candidate 903 of the storage class management table 504 and ends the process illustrated in FIG. 12. Specifically, when the requirements received in step S1210 is only the combination of the type of the failure and the redundancy, the CPU 301 outputs a selection result in step S1230. When the requirements received in step S1210 is only the requirements of the availability rate, the CPU 301 outputs the selection result in step S1240. When the requirements received in step S1210 includes the cost, the CPU 301 outputs the selection result in step S1250.

It is noted that, since the storage class setting program 510 reads the request for the data protection in step S1210, the storage class setting program 510 can also be called a "reading unit". In addition, in each step of steps S1230 to S1250, the method of the data protection of the storage is determined based on the user's request for the data protection from the viewpoint of the component, the viewpoint of the system, and the viewpoint of the cost, the storage class setting program 510 may also be called a "determination unit".

Figure 13:
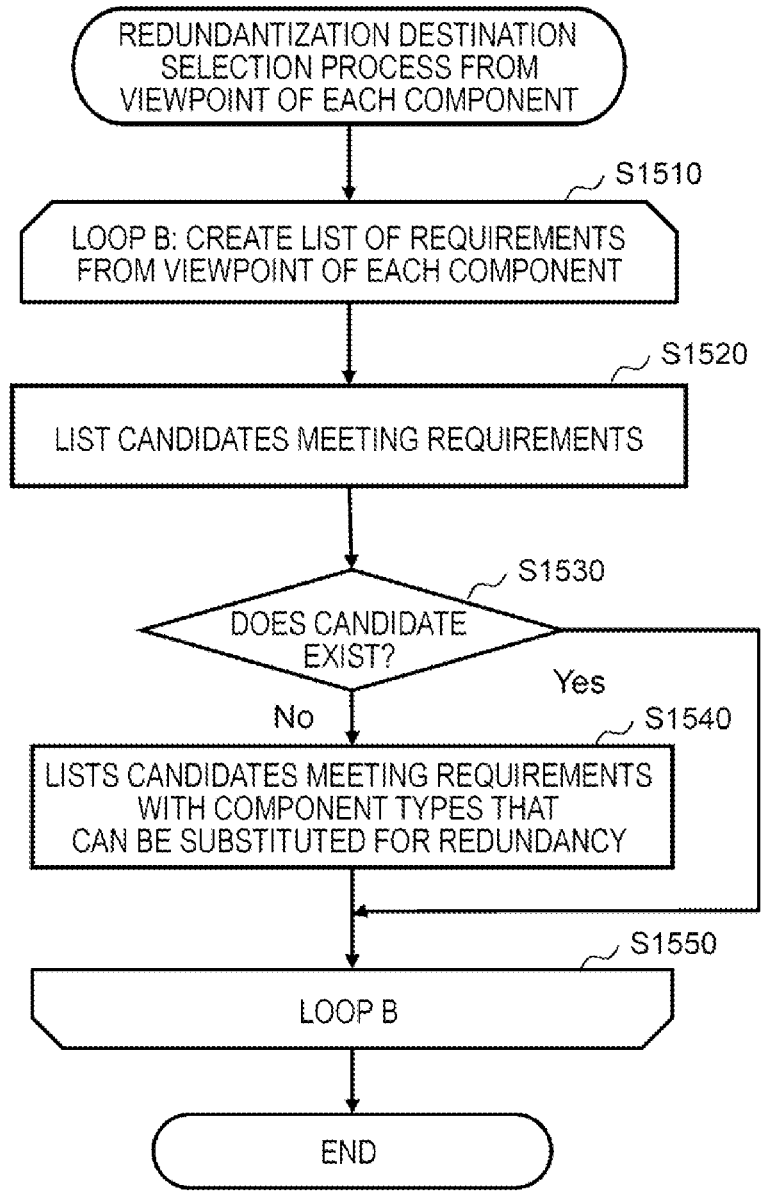
FIG. 13 is a flowchart illustrating a process of step S1230 in FIG. 12.

FIG. 13 is a flowchart illustrating step S1230 in FIG. 12, that is, the redundantization destination selection process from the viewpoint of each component. First, in step S1510, the CPU 301 creates a list of the requirements from the viewpoint of each component. Then, the CPU 301 executes the processes of steps S1520 to S1540 by setting each item of the created list as a process target in order. In step S1520, the CPU 301 extracts and lists the devices of the candidates matching the requirements that are process targets from the back-end device management table 502.

In the subsequent step S1530, the CPU 301 determines whether or not at least one candidate exists by the process of step S1520. When the CPU 301 determines that there exists at least one candidate, the process proceeds to step S1550, and when the CPU 301 determines that there exists no candidate, the process proceeds to step S1540. In step S1540, the CPU 301 refers to the redundantization relationship table 505 and lists the candidates matching the requirements with the component types that can be substituted for the redundantization, and the process proceeds to step S1550.

In step S1550, the CPU 301 determines whether or not all of the list of the requirements created in step S1510 are process target. Then, when there exist the requirements that are not the process targets, the CPU 301 executes the process of step S1520 and the subsequent steps by setting the unprocessed requirements as the process target. When the CPU 301 determines that all of the list is the process target, the CPU 301 ends the processing illustrated in FIG. 13.

Figure 14:
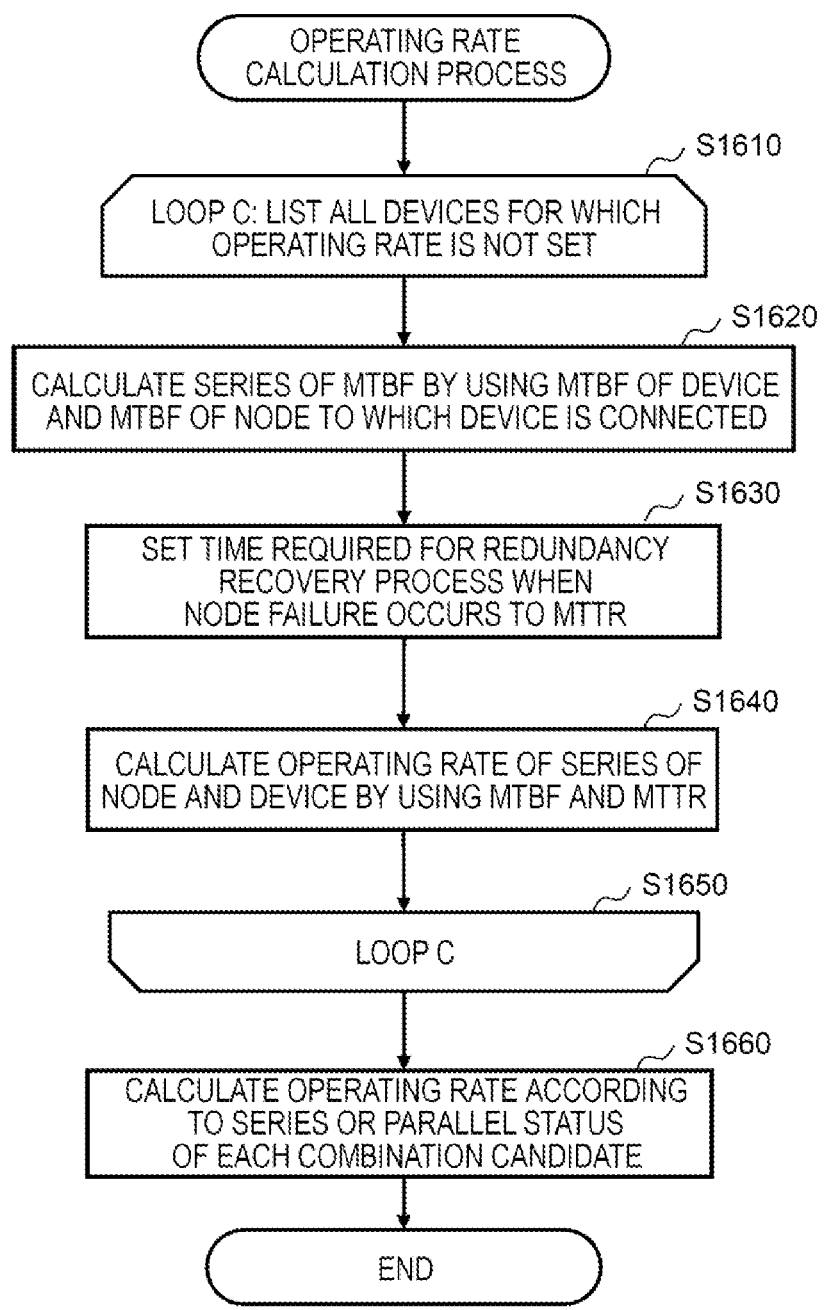
FIG. 14 is a flowchart illustrating an availability rate calculation process.

FIG. 14 is a flowchart illustrating an availability rate calculation process called as needed in step S1240 in FIG. 12. The CPU 301 repeats the processes of steps S1620 to S1640 for all the devices for which the availability rate is not set. Specifically, the CPU 301 lists all the devices for which the availability rate is not set and performs the processes of steps S1620 to S1640 one by each device as a process target (hereinafter, referred to as a "process target device").

In step S1620, the CPU 301 calculates a series of the MTBFs by using the MTBFs of the process target devices and the MTBFs of the nodes to which the process target devices are connected. When the MTBF of the process target device is set as X, the MTBF of the node to which the process target device is connected is set as Y, and the series of MTBFs that are calculation targets is set as Z, the value of Z having a relationship of $(1/Z)=(1/X)+(1/Y)$ is calculated.

In the subsequent step S1630, the CPU 301 sets, to the MTTR, the time required for the redundancy recovery process when a node failure occurs. In the subsequent step S1640, the CPU 301 calculates the availability rate of a series of the node and the device by using the MTBF and the MTTR. Specifically, the CPU 301 obtains the value of the availability rate by dividing the value of the MTBF by the sum of MTBF and MTTR. When the processes of steps S1620 to S1640 are repeated for all the devices for which the availability rate is not set, the CPU 301 proceeds to step S1660. In step S1660, the CPU 301 calculates the availability rate according to the series or parallel status of each combination candidate, and ends the process illustrated in FIG. 14.

Figure 15:
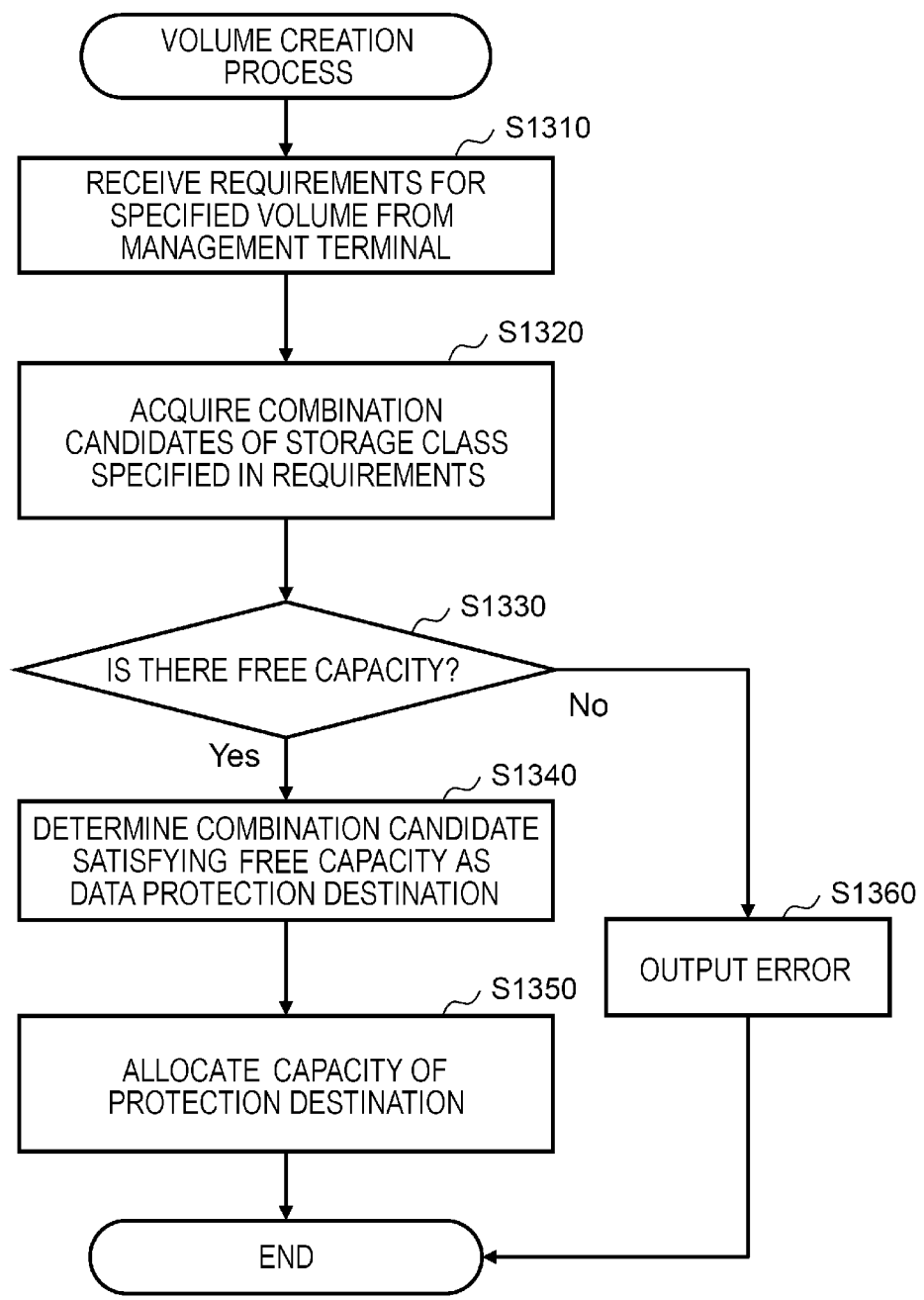
FIG. 15 is a flowchart illustrating a volume creation process executed by a volume creation program.

FIG. 15 is a flowchart illustrating a volume creation process executed by the volume creation program 511. The volume creation program 511 first receives the requirements of the designated volume from the management terminal 204 in step S1310. The requirements include at least the management number of the storage class or the requirements of the storage class that has been delivered in the past, and the requirements may include the designation of the capacity of the volume. The requirements are, for example, "a volume of 2 TB in the management number C1" and "a volume of 2 TB in which the device has 2 redundancy and the AZ has 2 redundancy". It is noted that, assuming the storage class management table 504 illustrated in FIG. 9, these two requirements are the same.

In the subsequent step S1320, the CPU 301 acquires the combination candidates of the storage class designated in the requirements by referring to the storage class management table 504. For example, in the previous example, the CPU 301 acquires the combination of D3 and P5, the combination of D4 and P5, and the combination of D4 and P5 as candidates. In the subsequent step S1330, the CPU 301 determines whether or not at least one of the candidates acquired in step S1320 has a sufficient free capacity. The "sufficient free capacity" is more free capacity when the capacity is designated in step S1310, and when the capacity is not designated in step S1310, the "sufficient free capacity" is for example, a predetermined capacity, for example, a free capacity of 1 TB.

When the CPU 301 determines that there exists a sufficient free capacity, the CPU 301 proceeds to step S1340, and when the CPU 301 determines that there is no free capacity in any candidate, the CPU 301 outputs an error in step S1360 and ends the process illustrated in FIG. 15. In step S1340, the CPU 301 determines the combination candidate satisfying the free capacity as a data protection destination among the candidates acquired in step S1320. In the subsequent step S1350, the CPU 301 allocates a capacity of the data protection destination determined in step S1340 and ends the process illustrated in FIG. 15. It is noted that, in the case of thick provisioning, the capacity of the determined protection destination is allocated, and in the case of thin provisioning, only the minimum necessary area is allocated.

It is noted that, when there is no single combination candidate satisfying the free capacity in step S1330, a different combination candidate may be used for each sub-volume. Similarly, when it is determined in step S1330 that there is not sufficient free capacity, instead of setting an error, the presence or absence of newly added components is checked, and when there is a new combination candidate satisfying the specifications of the storage class, the storage class management table 504 may be updated, and the volume creation process may be executed again.

Figure 16:
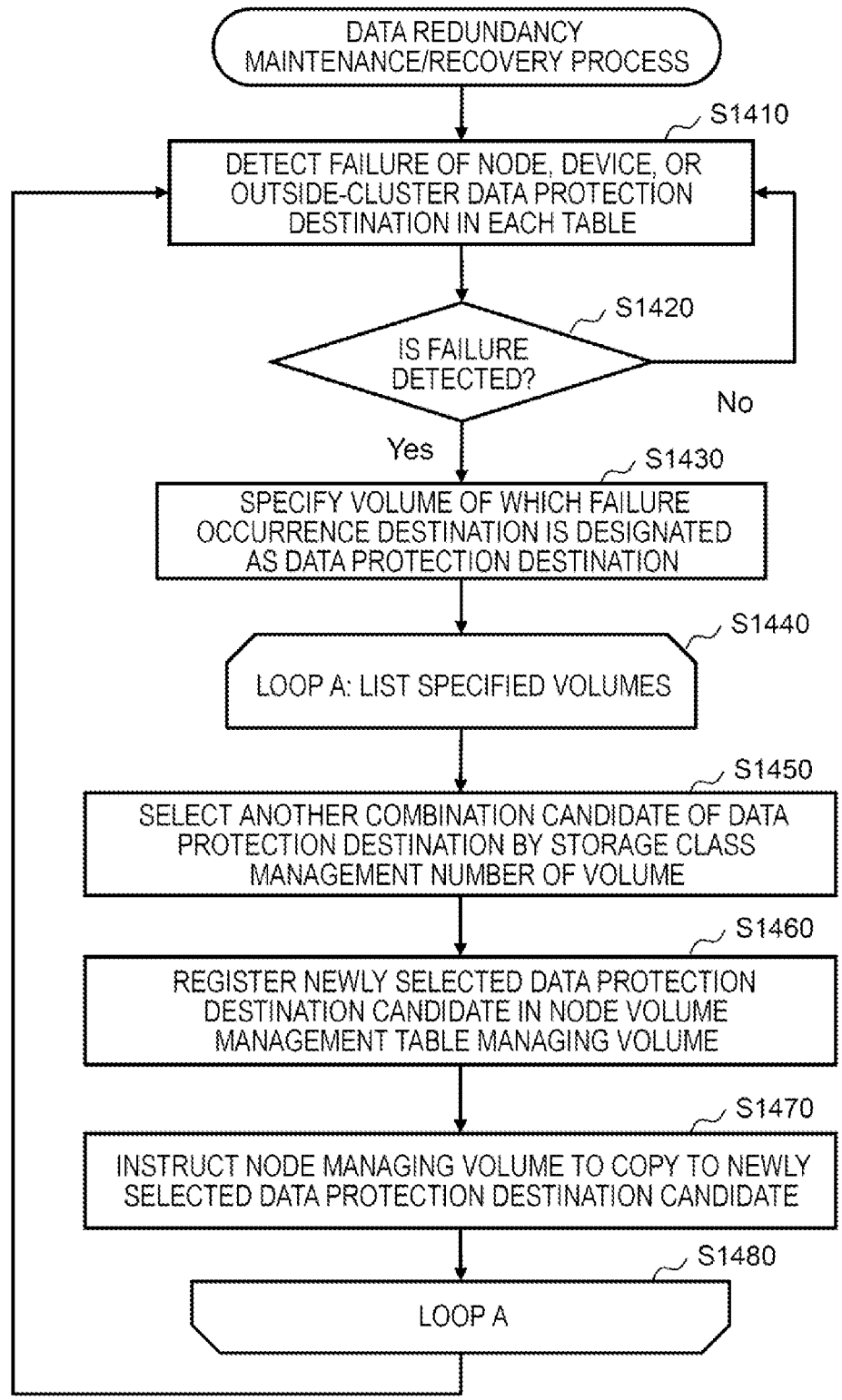
FIG. 16 is a flowchart illustrating a data redundancy maintenance/recovery process executed by a data redundancy maintenance/recovery program.

FIG. 16 is a flowchart illustrating a data redundancy maintenance/recovery process executed by the data redundancy maintenance/recovery program 512. First, in step S1410, the CPU 301 detects a failure of the node, device, or the outside-cluster data protection destination in each table. In the subsequent step S1420, the CPU 301 determines whether or not any failure is detected in the step S1410. When it is determined that the CPU 301 has detected some kind of failure, the process proceeds to step S1430, and when it is determined that no failure has been detected, the process returns to step S1410.

In step S1430, the CPU 301 specifies the volume of which failure occurrence destination is designated as the data protection destination by referring to the volume management table 421. For example, when a failure is detected in the device D3 in step S1410, the volumes V1 and V2 are specified with reference to the volume management table 421.

In the subsequent step S1440, the CPU 301 creates a list of the volumes specified in step S1430, and executes the processes of steps S1450 to S1470 by setting the volumes as the process targets in order. In step S1450, the CPU 301 specifies the storage class management number 1102 corresponding to the volume that is a process target and specifies combination candidates of the other data protection destinations by referring to the storage class management table 504. When the volume that is a process target is V1, D4+P5 having the same storage class management number C1 is also specified. It is noted that, in the selection of the data protection destination, the cost of recovering the redundancy of the data can be reduced by selecting the combination that includes many duplication destinations that overlap the original combination candidate.

In the subsequent step S1460, the CPU 301 registers the data protection destination candidate newly selected in step S1450 in the volume management table 421 that manages the volume. In the subsequent step S1470, the CPU 301 instructs the redundancy recovery process program 424 of the node that manages the volume to copy to the newly selected data protection destination, and the process proceeds to step S1480.

In step S1480, the CPU 301 determines whether or not the processes of steps S1450 to S1470 are executed by setting all the volumes specified in step S1430 as process targets. When the CPU 301 determines that the processes of steps S1450 to S1470 has been executed by using all the specified volumes as process targets, the process returns to step S1410, and when the CPU 301 determines that there exist unprocessed volumes, the process target is changed, and the process returns to step S1450.

Figure 17:
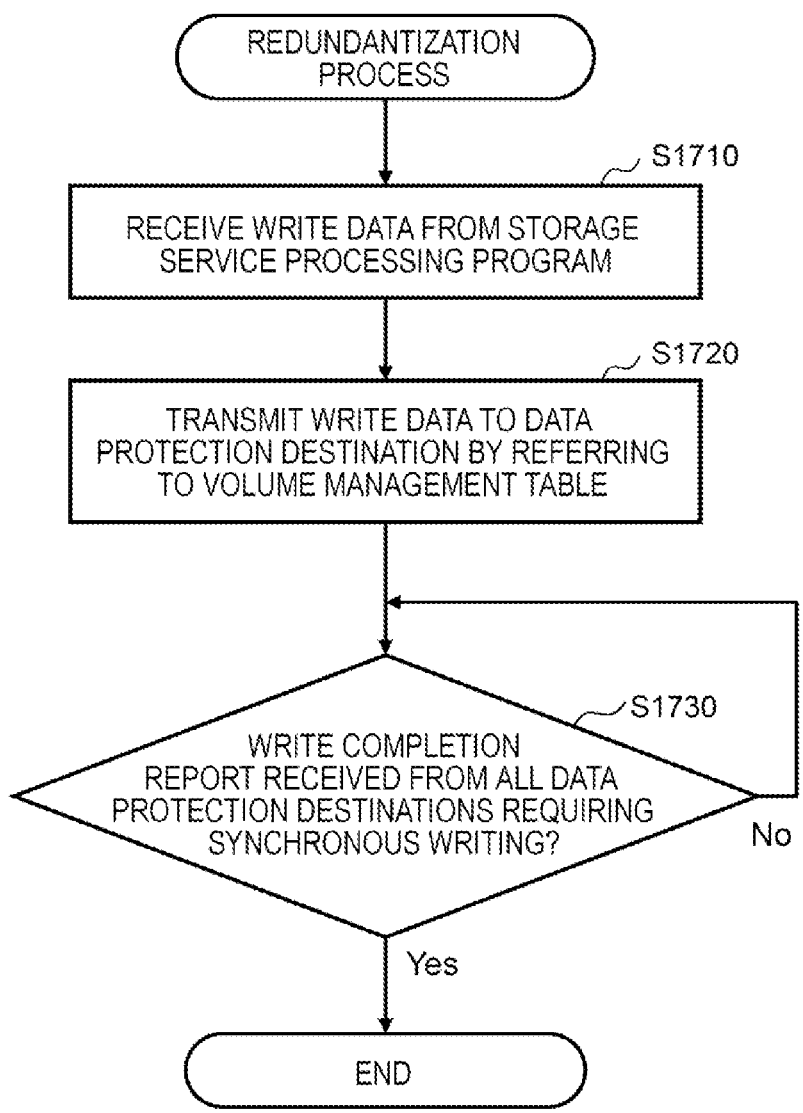
FIG. 17 is a flowchart illustrating a redundantization process executed by a redundantization process program.

FIG. 17 is a flowchart illustrating the redundantization process program 423. First, in step S1710, the CPU 301 receives write data from the storage service process program 422, that is, data to be written for redundantization.

In the subsequent step S1720, the CPU 301 transmits the write data received in the step S1710 to the data protection destination by referring to the volume management table 421. In the subsequent step S1730, the CPU 301 determines whether or not the writing completion report has been received from all the data protection destinations that require synchronous writing. When the CPU 301 determines that the completion report has not been received, the CPU 301 stays in step S1730, and when the CPU 301 determines that the completion report has been received, the CPU 301 ends the process illustrated in FIG. 17.

According to the first embodiment described above, the following effects can be obtained.

(1) The computer system 100 which is a storage management system has the CPU 301 which is a processor and manages a plurality of storages included in the storage system 120 and the integration-type computer cluster 112. The storage has a plurality of types of components and performs redundantization of the data to be stored by combining the plurality of components. The computer system 100 has the back-end device management table 502 which is component management information indicating the redundancy set in the component itself. The CPU 301 sets the data protection method of the storage based on the back-end device management table 502 and the request for the data protection for the data to be stored in the storage (storage class setting program 510: steps S1230 to S1250 in FIG. 12).

For this reason, the data protection can be appropriately performed based on the designated request for the data protection.

(2) The CPU 301 sets the data protection method of the storage so that the sum of the redundancy of the component itself described in the back-end device management table 502 and the redundancy set by combining the plurality of components satisfies the redundancy of the data included in the request for the data protection.

(3) The requirements of the data protection include a combination of the type of the failure of the component that protects the data and the redundancy of the data for its lifetime. For example, the storage classes of which storage class management numbers 901 are C1 and C3 in the storage class management table 504 illustrated in FIG. 9 include a combination of the type of the failure and the redundancy. The storage class setting program 510 selects a combination of devices satisfying the requested combination of the type of the failure and the redundancy by the process illustrated in step S1230 of FIG. 12, that is, the process illustrated in FIG. 13. For this reason, the computer system 100 can perform the data protection satisfying the required type of the failure and the redundancy.

(4) The request for the data protection includes the probability of availability. For example, the storage class of which storage class management number 901 is C2 in the storage class management table 504 illustrated in FIG. 9 includes the availability rate which is a probability of availability. The storage class setting program 510 selects a combination of devices satisfying the requested probability of availability by the process illustrated in step S1240 of FIG. 12 and the process illustrated in FIG. 14, as needed. For this reason, the computer system 100 can perform the data protection satisfying the requested availability requirements.

(5) The request for the data protection includes the cost required for the data protection. For example, the storage class of which storage class management number 901 is C3 in the storage class management table 504 illustrated in FIG. 9 includes a cost. The storage class setting program 510 selects a combination of the devices that satisfies the requested cost by the process of step S1250 of FIG. 12. For this reason, the computer system 100 can perform the data protection satisfying the requirements of the requested cost.

(6) At least one storage included in the plurality of storages is subjected to the back-end protection which is the data protection on the back-end not managed by the storage management system. A determination unit (storage class setting program 510: step S1230 in FIG. 12) determines the data protection method of the storage based on the back-end protection and the request for the data protection. For this reason, when a device provided with the back-end protection is used, excessive protection can be prevented. For example, in a case where the requested requirements of the protection are 2 redundancy for the device failure, when the device has failure tolerance of the "device" as illustrated in a device number D2 in FIG. 7, since the requirements are already satisfied, a data is stored without performing further protection, so that excessive protection is prevented. For example, it is known that, in the public cloud, the service provider may provide the data protection of the device as standard or optional, and the service provider may further provide the back-end protection in the region or at the site level. When such a device in the public cloud is used, excessive protection can be prevented in consideration of the back-end protection.

(7) The computer system 100 has the data redundancy maintenance/recovery program 512 that detects the failure in the plurality of storages and stores the data stored in the storage in which the failure is detected in response to the request for the data protection for the data in several storages other than the storage in which the failure is detected among the plurality of storages. For this reason, when the failure occurs in the storage, appropriate data protection can be performed without excess or deficiency.

(8) Each of the plurality of storages is managed by any one of two or more nodes. The determination unit (step S1540 of FIG. 13) can select the redundantization of the node instead of the redundantization of the storage. For this reason, it is possible to satisfy the user's request with different protection levels.

(9) The management method executed by the cluster management computer 203 included in the computer system 100 manages the plurality of storages included in the computer system 100 as follows. That is, the management method includes reading the request for the data protection for the data stored in at least one storage included in the plurality of storages (step S1210 in FIG. 12) and determining the data protection method of the storage based on the request for the data protection (steps S1230 to S1250 of FIG. 12). For this reason, the data protection can be appropriately performed based on the designated request for the data protection.

Modified Example 1

The storage class setting program 510 may further take into consideration the data protection in the application that outputs the data. For example, when the application stores the data in a plurality of availability zones and the requested requirements of the protection are 2 redundancy for the AZ failure, the storage class setting program 510 uses the device with a redundancy of "1" alone as a data protection destination. This is because the application has already performed duplication and, when the storage class setting program 510 performs further protection, excessive protection is performed.

In Modified Example, the user uses the management terminal 204 to input the requirements of the storage class, the creation of the volume, and the data protection method of the application (hereinafter, referred to as an "assumed application") that is assumed to perform writing to the volume. The data protection method is a concept that corresponds to the requirements for the data protection and indicates how to protect a data. For example, the data protection method includes device protection for storing the same data in different devices, node protection for storing the same data in different nodes, AZ protection for storing the same data in different AZs, and the like.

It is noted that, instead of allowing the user to input the data protection method of the assumed application, the user may be allowed to input the identification information of the assumed application and the storage class setting program 510 may be allowed to refer to a correspondence table between the identification information and the data protection method (not illustrated).

Figure 18:
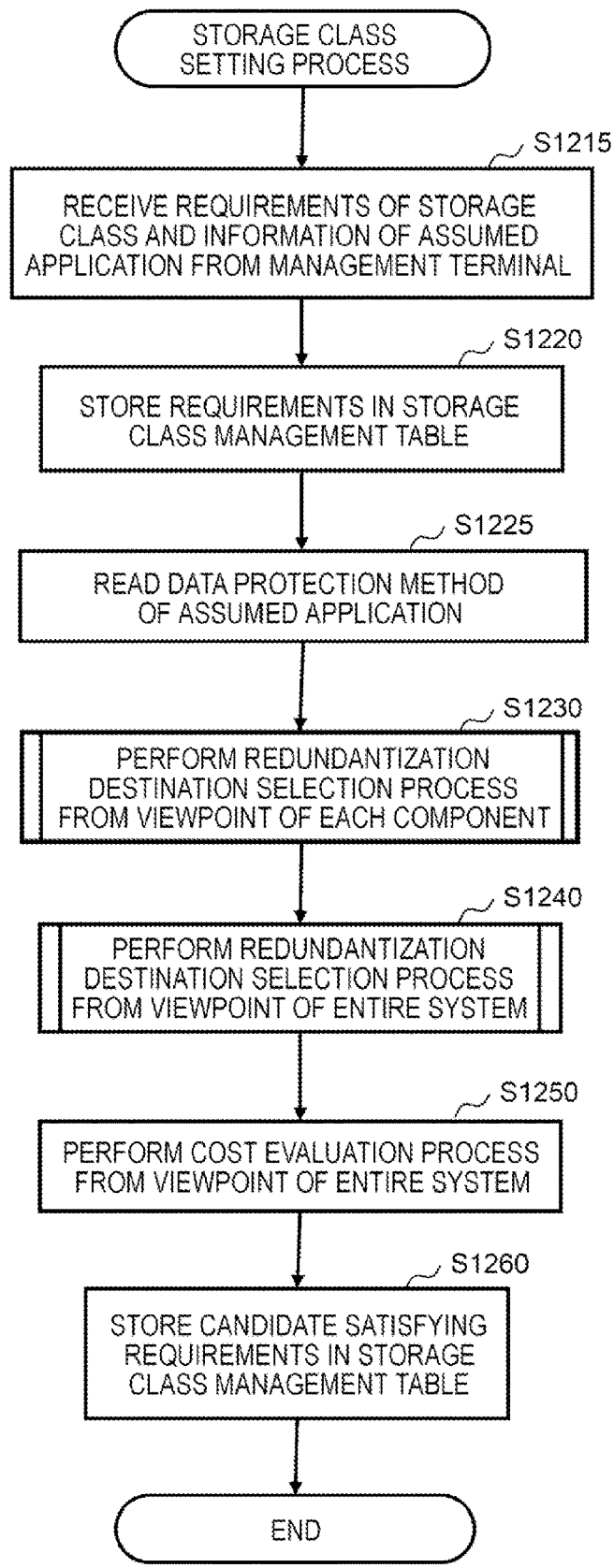
FIG. 18 is a flowchart illustrating a storage class setting process in Modified Example 1.

FIG. 18 is a flowchart illustrating the storage class setting process in Modified Example 1 and corresponds to FIG. 12 in the first embodiment. Hereinafter, the differences from FIG. 12 will be mainly described. In step S1215 which is first executed, the CPU 301 receives not only the requirements of the storage class but also the information of the assumed application from the management terminal 204, and the process proceeds to step S1220. In step S1225 which is executed after step S1220, the CPU 301 reads the data protection method of the application that performs writing to the volume created in the storage class. When the information of the assumed application received in step S1215 is the data protection method of the assumed application, the information is used as it is. In addition, when the information of the assumed application received in step S1215 is the identification information of the assumed application, the data protection method is read by referring to the correspondence table between the above-mentioned identification information and the data protection method. In steps S1230 and S1240, the CPU 301 determines the data protection method of the storage based on the data protection method of the application and the request for the data protection.

According to Modified Example 1, the following effects can be obtained.

(10) The request for the data protection includes information on the data protection implemented by the assumed application that is assumed to use the storage. The determination unit (steps S1530 to S1550 in FIG. 18) determines the method of the data protection of the storage based on the data protection performed by the assumed application and the request for the data protection. For this reason, the computer system 100 can implement t data protection without excess or deficiency in consideration of the data protection method of the application that performs writing to the volume.

In the above-described embodiments and modified examples, the configurations of the functional blocks are merely an example. Several functional configurations illustrated as separate functional blocks may be integrally configured, or the configuration represented by one functional block diagram may be divided into two or more functions. In addition, a portion of the functions included in each functional block may be configurations included in another functional block.

What is claimed is:

1. A storage management system having a processor and managing a plurality of storages,
wherein the at least one storage included in the plurality of storages has a plurality of types of components, performs redundantization of a data to be stored by combining the plurality of components, wherein performing redundantization of data comprises
receiving write data from a storage service processing program,
transmitting write data to at least one data protection destination by referring to a volume management table, and
writing a completion report, received from the at least one data protection destination, requiring synchronous writing, and
wherein the storage management system comprises a back-end device management table and has component management information indicating redundancy set for the component itself, and
wherein the processor sets a method of data protection of the storage based on the component management information and a request for the data protection for the data stored in the storage, wherein the method of data protection comprises
performing redundantization destination selection process from a viewpoint of each component, and
performing a redundantization destination process from a viewpoint of the entire system.

2. The storage management system according to claim 1, wherein at least one storage included in the plurality of storages is subjected to back-end protection which is data protection on a back-end not managed by the storage management system, and
wherein the method of the data protection of the storage is determined based on the back-end protection and the request for the data protection.

3. The storage management system according to claim 1, wherein the processor sets the method of the data protection of the storage so that a sum of redundancy of the component itself recorded in the component management information and the redundancy set by combining the plurality of components satisfies redundancy of the data included in the request for the data protection.

4. The storage management system according to claim 1, wherein the request for the data protection includes a combination of a type of failure and redundancy.

5. The storage management system according to claim 1, wherein the request for the data protection includes a probability of availability.

6. The storage management system according to claim 1, wherein the request for the data protection includes a cost required for the data protection.

7. The storage management system according to claim 1, wherein the request for the data protection includes information on the data protection performed by an assumed application in which the storage is assumed to be used, and
wherein the method of the data protection of the storage is determined based on the data protection performed by the assumed application and the request for the data protection.

8. The storage management system according to claim 1, wherein the storage management system performs a recovery process of detecting a failure in the plurality of storages and storing the data stored in the storage in which the failure is detected in several storages other than the storage in which the failure is detected among the plurality of storages in response to the request for the data protection for the data.

9. The storage management system according to claim 1, wherein the component includes nodes and storage devices.

10. A management method executed by a storage management system having a processor and managing a plurality of storages,
wherein the at least one storage included in the plurality of storages has a plurality of types of components, and a data to be stored is redundantized by combining the plurality of components, wherein performing redundantization of data comprises
receiving write data from a storage service processing program,
transmitting write data to at least one data protection destination by referring to a volume management table, and
writing a completion report, received from the at least one data protection destination, requiring synchronous writing, and
wherein the storage management system comprises a back-end device management table and has component management information indicating redundancy set for the component itself, and
wherein the processor sets a method of data protection of the storage based on the component management information and a request for the data protection for the data stored in the storage, wherein the method of data protection comprises
performing redundantization destination selection process from a viewpoint of each component, and
performing a redundantization destination process from a viewpoint of the entire system.

* * * * *